J. M. SKINNER.
FILLING DEVICE FOR BATTERY CELLS.
APPLICATION FILED OCT. 10, 1916.
1,244,909.
Patented Oct. 30, 1917.
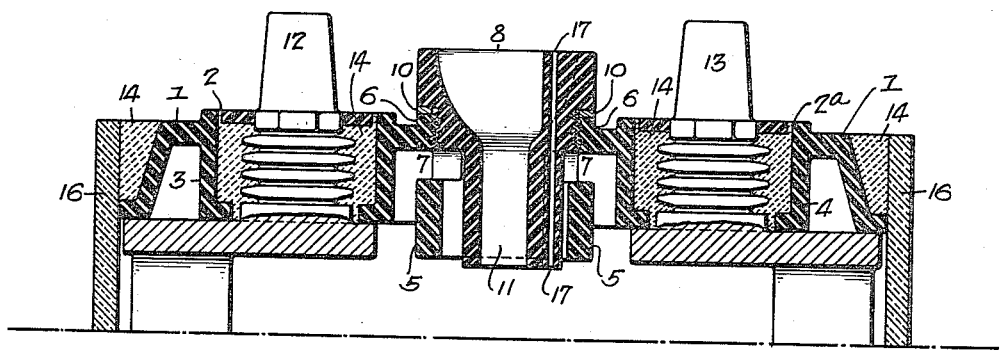
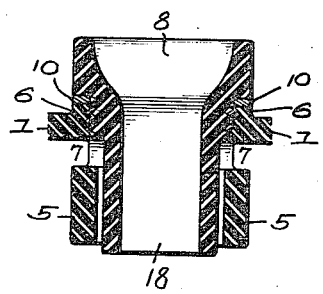
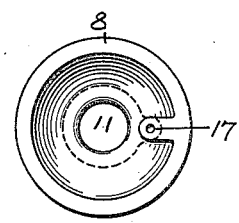
Inventor:-
James M. Skinner.
by his Attorneys.
Howson & Howson

UNITED STATES PATENT OFFICE.

JAMES M. SKINNER, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

FILLING DEVICE FOR BATTERY-CELLS.

1,244,909.  Specification of Letters Patent.  Patented Oct. 30, 1917.

Application filed October 10, 1916.  Serial No. 124,908.

*To all whom it may concern:*

Be it known that I, JAMES M. SKINNER, a citizen of the United States, residing in Philadelphia, Pennsylvania, have invented Filling Devices for Battery-Cells, of which the following is a specification.

One object of my invention is to provide a relatively simple, and inexpensive device for use in supplying water or electrolyte to storage battery cells;—the construction being such as to definitely limit the height to which the liquid can rise in the cell during the filling operation while allowing the free venting of air until the desired quantity of said liquid has been supplied.

A further object of the invention is to provide a filling device which will give visible indication when a storage battery cell has been filled to a predetermined level and which shall thereafter prevent the inflow of further liquid, the construction being such as to permit of its convenient application and use.

These objects and other advantageous ends I secure as hereinafter set forth, reference being had to the accompanying drawings, in which, Figure 1 is a vertical section of the cover of a storage battery cell illustrating my invention as applied thereto;

Fig. 2 is a plan of the filling device shown in Fig. 1; and

Fig. 3 is a fragmentary vertical section illustrating another form of my invention.

In the above drawings, 1 represents a casting or molded structure of hard rubber or other suitable insulating and acid proof material formed to constitute the cover of a storage or other battery cell and having a flat top portion in which are formed two openings 2 and 2$^a$ having set in them inwardly or downwardly extending sleeves 3 and 4 designed for the reception of the battery terminals 12 and 13. These two openings are placed adjacent the ends of the top of the cover and between them is a third opening circular in outline in which is mounted an inwardly extending sleeve 5.

This latter sleeve has a portion 6 projecting a short distance above the top surface of the cover 1 and is provided with vent holes or passages 7 leading into it from the highest portions of the interior of the cover structure, which has outwardly extending flanges designed to closely fit within a battery cell. The upper interior portion of the sleeve 5 is threaded for the reception of a funnel shaped filling tube 8 made of acid proof material.

The upper end of this filling device is outwardly flanged or extended to a diameter substantially the same as that of the upper exterior flange 6 of sleeve 5, between the top edge of which and said flange is placed a washer or gasket 10 designed to make an air-tight connection between said cover and the filling tube, though obviously this may be omitted if the fit of said tube is sufficiently perfect to prevent the appreciable escape of air during the filling operation. The lower end 11 of the filling tube preferably though not necessarily is of a diminished diameter and extends to and slightly beyond the lower end of the sleeve 5.

Sealing material 14 is placed around the terminals 12 and 13 within the sleeves 3 and 4 and likewise in the narrow space between the sloping sides or flanges of the cover and the adjacent walls 16 of the battery cell, so that it will be understood the latter is hermetically sealed or air-tight except for the opening through the sleeve 5. Consequently when it is desired to fill the battery, the funnel shaped tube 8 is screwed into the upper end of the sleeve until the washer 10, which is preferably carried by said tube, is caused to make an air-tight connection between it and the flange 6.

The liquid to be placed in the battery may now be poured into the open end of the filling tube until it rises to the lower end of the contracted portion thereof, after which said liquid rises within said tube, thus giving visible indication of the fact that the cell has been sufficiently filled. The filling tube 8 is then unscrewed, permitting the liquid within it to flow into the cell, which thus contains a definite and predetermined quantity of liquid whose amount cannot be exceeded, since until the filling tube is unscrewed it cannot rise higher within the cell than a plane passing through the bottom of the filling tube.

Obviously the sleeve 5 may be omitted without departing from my invention, although I may employ it as shown, with the gas vent openings 7, and under operating conditions mour⸺ in it some device for preventing splashing out of liquid in the cell, such for example, as that shown in an application for U. S. Patent, made jointly by myself and Messrs. Mortimer and Pearson, filed October 6, 1916; Serial Number 124,097.

In that form of the invention shown in Figs. 1 and 2, I usually employ a filling tube having a contracted lower end 11 and provide this tube with a passage 17 to allow the escape of air from the cell while the liquid is entering through the tube, in order to prevent the latter being choked and thus delaying such liquid inflow. In some cases, however, where it is possible to make the lower end of the filling tube of comparatively large diameter, as indicated at 18 in Fig. 3, there is no possibility of its becoming choked and the air vent passage may therefore be omitted. In any case the filling tube is removably fitted into an opening in the cover 1 so as to make an air-tight connection therewith and by means of its lower end, limit the height to which the liquid delivered to it may rise within the cell, which is otherwise hermetically sealed.

By making the filling device removable, it is possible to provide the cell with a relatively large, readily accessible filling opening and at the same time accurately limit the height of the liquid to the desired level.

I claim:—

1. The combination of a cell having an air-tight cover provided with a vertically extending integral sleeve defining a filling opening; with a funnel shaped filling tube making a temporary but substantially air-tight joint with the upper part of said sleeve and projecting a definite distance into the latter in a position to limit the height to which liquid may rise in the cell, there being vent openings through the sleeve at substantially the highest point of the interior space of the cell.

2. A cover provided with a filling opening, and a tube removably mounted in said opening so as to make an air-tight joint with said cover, said tube extending a definite distance into the cell to which said cover is applied and being provided with an air venting passage independent of its main passage.

3. The combination of a cell having a sealed cover provided with an opening; a sleeve in said opening extending into the cell and having a passage through the wall into said cell; with a filling tube mounted in the opening in position to extend a definite distance into the cell and making an air-tight joint with the edge of the opening.

4. The combination of a cell having a sealed cover provided with an opening; a sleeve in said opening extending into the cell and having a passage through its wall into said cell at substantially the highest point of the interior thereof; with a removable filling tube mounted in the opening in position to extend a definite distance into the cell and making an air-tight joint with the edge of the opening.

JAMES M. SKINNER.